Patented Mar. 27, 1934

1,952,057

UNITED STATES PATENT OFFICE

1,952,057

CATALYST AND METHOD OF MAKING THE SAME

Frederick Alexander Ferrier Crawford and William Arthur Percival Challenor, Saltcoats, Scotland, assignors to Imperial Chemical Industries Limited, a corporation of Great Britain No Drawing. Application May 3, 1930, Serial No. 449,679. In Great Britain May 3, 1929

14 Claims. (Cl. 23—233)

This invention relates to chemical processes and more specifically to methods of making catalyst carriers suitable for use in such processes, especially carriers for vanadium compounds, platinum or the like.

Many methods of preparing catalyst carriers to carry for instance vanadium compounds, platinum or the like have been proposed or tried, the catalyst carriers including such materials as pumice.

It has also been proposed to make a catalyst by mixing guhr and gelatinous silicic acid with salts to act as binding agents.

The object of the present invention is to provide an improved catalyst carrier having substantial mechanical strength and not liable to disintegrate readily.

The invention consists in a method of making a catalyst carrier which comprises the incorporation of guhr with a solution of a soluble silicate and precipitation of silicic acid from this solution on to and in the guhr by the addition of an acid or other suitable reagent, for example, ammonium carbonate, whereby a gelatinous precipitate is formed which can be dried to a hard mass of high porosity on which vanadium compounds, platinum or the like may be deposited, after which the product may be pelleted if desired.

The invention also consists in processes for making catalyst carriers substantially as hereinafter described and in catalyst carriers which may be made by those processes or by the equivalents thereof.

The following examples illustrate how the invention may be carried into effect, references to parts being to parts by weight:—

Example 1

1.2 parts of guhr are added to 240 parts of a dilute solution of commercial water glass and the mixture stirred vigorously whilst an equal volume of dilute hydrochloric acid is added, both water glass and acid solutions being approximately of strength 0.8 normal.

The mixture is stirred gently until it has set to a firm gel, which may take about five minutes. After allowing to stand, the mixture is thoroughly washed and dried, preferably at a temperature below about 100° C.

The catalyst carrier thus made may be coated with catalyst in any suitable way.

In one form 13 parts of the product prepared as described above are treated with 9.3 parts of a solution containing platinum chloride and a suitable reducing agent, the reduction of the platinum being effected by heat treatment. The mass is then washed and dried.

A catalyst prepared as described above may be used as a platinum catalyst in chemical reactions where such a catalyst can be employed, for example, for the conversion of sulphur dioxide to sulphur trioxide.

According to one method the activity of the catalyst mass so prepared is determined by placing it in a hard glass tube heated by an electric furnace. Purified burner gases containing 6–7% of sulphur dioxide are then passed through the tube at the rate of approximately 1000 litres per hour per gramme of platinum contained, and the temperature is adjusted till the conversion reaches a maximum. This is found to be about 95%, whereas other known catalyst masses tested under the same conditions, give approximately 85% conversion.

Example 2

20 parts of guhr are added to a solution of 26 parts of potassium silicate solution (35° Bé.) in 130 parts of water and sufficient 10% sulphuric acid is added with rapid stirring to liberate all the silicic acid. The mixture is warmed till the formation of gel is complete, sufficient water is then added till the mixture can be readily stirred followed by the addition of a solution containing 1.93 parts of ammonium vanadate and 0.95 parts of potassium hydrate. The whole is stirred for a long period to ensure thorough mixing, and is then slowly evaporated. The cake formed by evaporation is broken up into granules which may be used as such or may be formed into pellets in a tablet or similar machine.

A modified method is to dry the mixed precipitate of guhr and silicic acid, powder, and then treat with a solution of a soluble vanadium compound, dry and form into pellets. Pellets made in this manner show excellent mechanical strength under operating conditions.

General

It has been found that with a catalyst such as platinum there is greater activity when the carrier is made according to the methods described above, in comparison with an asbestos or like normal carrier.

Modifications may be made in the processes described above.

The catalytic material may be added to the mixture of guhr and silicic acid before the silicic acid has assumed the gel form.

The invention is not limited to the use of the catalytic materials mentioned, for instance, chromium compounds either alone or mixed with other materials may be used.

Masses made by processes described above are all suited for catalyst carriers, presumably on account of the exceptionally high porosity which appears to be brought about by the minute guhr cells which are firmly embedded in the structure.

Having now described our invention, what we claim as new and desire to secure by Letters Patent is:—

1. The method of making a catalyst carrier which comprises precipitating silicic acid on guhr from a solution of a soluble silicate, and drying the composite mass so produced.

2. The method of making a catalyst carrier which comprises distributing guhr throughout a solution of a soluble silicate, precipitating silicic acid upon the guhr from the solution, thoroughly washing the composite mass of guhr and silicic acid, and drying the mass at a temperature below 100° C.

3. The method of preparing a catalyst carrier which comprises commingling guhr with a dilute solution of an alkaline metal silicate, acidifying the solution whereby silicic acid is precipitated, thoroughly washing the composite mass of guhr and silicic acid, and drying the mass at a temperature below 100° C.

4. The method of making a catalyst which comprises depositing silicic acid on guhr, treating the mass of guhr and silicic acid with a solution containing a salt of a metal having a catalytic effect, and drying the treated mass.

5. The process of preparing a catalyst which comprises precipitating silicic acid on guhr from a solution of soluble silicate, thoroughly washing the mass of guhr and silicic acid, subjecting the same to a drying operation, and treating the material with a solution containing a salt of a catalytic metal.

6. The method of preparing a catalyst which comprises commingling guhr with a solution of an alkaline metal silicate, acidifying the solution to liberate the silicic acid, warming till the formation of gel is complete, adding a solution containing a salt of a metal having catalytic properties, and drying the material so produced.

7. A catalyst carrier prepared by impregnating guhr with silicic acid and drying the impregnated mass.

8. A catalyst carrier prepared by precipitating silicic acid on guhr from a solution of a soluble silicate, washing the composite mass, and drying to obtain a carrier of high porosity and substantial mechanical strength.

9. A catalyst of high mechanical strength and porosity prepared by precipitating silicic acid from solution on guhr, subsequently treating the impregnated guhr with a solution containing highly active catalytic material, and subjecting the mass to drying.

10. The process of catalyzing chemical reactions which comprises effecting such reactions in the presence of a catalyst for the reaction which is supported on a body of guhr containing silicic acid precipitated thereon.

11. The process of catalyzing chemical reactions which comprises effecting such reactions in the presence of a catalyst which has been prepared by precipitating silicic acid from solution on guhr, treating the mass so produced with a solution containing a salt of a metal which catalyzes the reaction, and subjecting the mass so produced to a drying operation.

12. The method of effecting an oxidation reaction which comprises carrying on the reaction in the presence of a catalyst prepared by impregnating guhr with silicic acid, treating the impregnated material with a solution containing a salt of a metal which exerts a catalytic effect on oxidation reactions, and drying the mass so produced.

13. The method of forming sulfur trioxide by the oxidation of sulfur dioxide which comprises passing a mixture of sulfur dioxide and oxygen at an elevated temperature over a catalyst prepared by precipitating silicic acid and guhr from solution, thoroughly washing and drying the mass so produced whereby to obtain a catalyst carrier of high mechanical strength and porosity, treating the mass with a solution containing a salt of a metal which catalyzes the reaction between sulfur dioxide and oxygen, and washing and drying the catalytic body so prepared.

14. A catalyst carrier prepared by distributing guhr through a solution of a soluble silicate, precipitating silicic acid upon the guhr of the solution, and drying the composite mass of guhr and silicic acid.

FREDERICK ALEXANDER
    FERRIER CRAWFORD.
WILLIAM ARTHUR
    PERCIVAL CHALLENOR.

CERTIFICATE OF CORRECTION.

Patent No. 1,952,057.      March 27, 1934.

FREDERICK ALEXANDER FERRIER CRAWFORD, ET AL.

It is hereby certified that error appears in the printed specification of the above numbered patent requiring correction as follows: Page 2, strike out lines 49 to 51 inclusive, comprising claim 7; and for the claim numbers "8, 9, 10, 11, 12, 13, and 14," read 7, 8, 9, 10, 11, 12, and 13; and that the said Letters Patent should be read with these corrections therein that the same may conform to the record of the case in the Patent Office.

Signed and sealed this 15th day of May, A. D. 1934.

Bryan M. Battey (Seal)      Acting Commissioner of Patents.

catalytic materials mentioned, for instance, chromium compounds either alone or mixed with other materials may be used.

Masses made by processes described above are all suited for catalyst carriers, presumably on account of the exceptionally high porosity which appears to be brought about by the minute guhr cells which are firmly embedded in the structure.

Having now described our invention, what we claim as new and desire to secure by Letters Patent is:—

1. The method of making a catalyst carrier which comprises precipitating silicic acid on guhr from a solution of a soluble silicate, and drying the composite mass so produced.

2. The method of making a catalyst carrier which comprises distributing guhr throughout a solution of a soluble silicate, precipitating silicic acid upon the guhr from the solution, thoroughly washing the composite mass of guhr and silicic acid, and drying the mass at a temperature below 100° C.

3. The method of preparing a catalyst carrier which comprises commingling guhr with a dilute solution of an alkaline metal silicate, acidifying the solution whereby silicic acid is precipitated, thoroughly washing the composite mass of guhr and silicic acid, and drying the mass at a temperature below 100° C.

4. The method of making a catalyst which comprises depositing silicic acid on guhr, treating the mass of guhr and silicic acid with a solution containing a salt of a metal having a catalytic effect, and drying the treated mass.

5. The process of preparing a catalyst which comprises precipitating silicic acid on guhr from a solution of soluble silicate, thoroughly washing the mass of guhr and silicic acid, subjecting the same to a drying operation, and treating the material with a solution containing a salt of a catalytic metal.

6. The method of preparing a catalyst which comprises commingling guhr with a solution of an alkaline metal silicate, acidifying the solution to liberate the silicic acid, warming till the formation of gel is complete, adding a solution containing a salt of a metal having catalytic properties, and drying the material so produced.

7. A catalyst carrier prepared by impregnating guhr with silicic acid and drying the impregnated mass.

8. A catalyst carrier prepared by precipitating silicic acid on guhr from a solution of a soluble silicate, washing the composite mass, and drying to obtain a carrier of high porosity and substantial mechanical strength.

9. A catalyst of high mechanical strength and porosity prepared by precipitating silicic acid from solution on guhr, subsequently treating the impregnated guhr with a solution containing highly active catalytic material, and subjecting the mass to drying.

10. The process of catalyzing chemical reactions which comprises effecting such reactions in the presence of a catalyst for the reaction which is supported on a body of guhr containing silicic acid precipitated thereon.

11. The process of catalyzing chemical reactions which comprises effecting such reactions in the presence of a catalyst which has been prepared by precipitating silicic acid from solution on guhr, treating the mass so produced with a solution containing a salt of a metal which catalyzes the reaction, and subjecting the mass so produced to a drying operation.

12. The method of effecting an oxidation reaction which comprises carrying on the reaction in the presence of a catalyst prepared by impregnating guhr with silicic acid, treating the impregnated material with a solution containing a salt of a metal which exerts a catalytic effect on oxidation reactions, and drying the mass so produced.

13. The method of forming sulfur trioxide by the oxidation of sulfur dioxide which comprises passing a mixture of sulfur dioxide and oxygen at an elevated temperature over a catalyst prepared by precipitating silicic acid and guhr from solution, thoroughly washing and drying the mass so produced whereby to obtain a catalyst carrier of high mechanical strength and porosity, treating the mass with a solution containing a salt of a metal which catalyzes the reaction between sulfur dioxide and oxygen, and washing and drying the catalytic body so prepared.

14. A catalyst carrier prepared by distributing guhr through a solution of a soluble silicate, precipitating silicic acid upon the guhr of the solution, and drying the composite mass of guhr and silicic acid.

FREDERICK ALEXANDER
    FERRIER CRAWFORD.
WILLIAM ARTHUR
    PERCIVAL CHALLENOR.

CERTIFICATE OF CORRECTION.

Patent No. 1,952,057.  March 27, 1934.

FREDERICK ALEXANDER FERRIER CRAWFORD, ET AL.

It is hereby certified that error appears in the printed specification of the above numbered patent requiring correction as follows: Page 2, strike out lines 49 to 51 inclusive, comprising claim 7; and for the claim numbers "8, 9, 10, 11, 12, 13, and 14," read 7, 8, 9, 10, 11, 12, and 13; and that the said Letters Patent should be read with these corrections therein that the same may conform to the record of the case in the Patent Office.

Signed and sealed this 15th day of May, A. D. 1934.

Bryan M. Battey (Seal)  Acting Commissioner of Patents.